US006221283B1

(12) United States Patent
Dharmarajan et al.

(10) Patent No.: US 6,221,283 B1
(45) Date of Patent: Apr. 24, 2001

(54) CONDUCTIVE COMPOSITIONS WITH COMPOSITIONALLY CONTROLLED BULK RESISTIVITY

(75) Inventors: Raja Dharmarajan, Bayway, TX (US); Robert Hossan; Biswaroop Majumdar, both of Delmar, NY (US); Alan Oshinski, Vernon, IN (US); Christiaan H. Koevoets, Roosendaal (NL); Jan P H Keulen, Ossendrecht (NL); Antoinette C. van Bennekom, Bergen op Zoom (NL); Johannes Matthijssen, Wouw (NL); Ilse Schlosser, Spijkenisse (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/440,720

(22) Filed: Nov. 16, 1999

Related U.S. Application Data

(63) Continuation-in-part of application No. 09/307,194, filed on May 7, 1999, now abandoned.

(51) Int. Cl.[7] .............................. H01B 1/24; C08K 3/04; C08L 77/00; C08L 71/12
(52) U.S. Cl. ........................ 252/511; 524/505; 524/538; 523/351; 525/397
(58) Field of Search ............................ 252/511; 524/538, 524/505; 525/397; 523/351

(56) References Cited

U.S. PATENT DOCUMENTS

| 3,078,254 | 2/1963 | Zelinski et al. . |
|---|---|---|
| 3,265,765 | 8/1966 | Holden et al. . |
| 3,297,793 | 12/1962 | Dollinger . |
| 3,402,159 | 9/1968 | Hsieh . |
| 3,594,452 | 7/1971 | De La Mare et al. . |
| 5,591,382 | * 1/1997 | Nahass . |
| 5,741,846 | * 4/1998 | Cohmeijer . |
| 5,843,340 | * 12/1998 | Silvi . |

FOREIGN PATENT DOCUMENTS

| 0682084A2 | 11/1995 | (EP) . |
|---|---|---|
| 0685527A1 | 12/1995 | (EP) . |
| 0971368A1 | 1/2000 | (EP) . |
| 2728100 | 3/1996 | (FR) . |
| 1264741 | 2/1972 | (GB) . |
| 6-045105 | 2/1994 | (JP) . |
| 7-048508 | 2/1995 | (JP) . |
| 7-207142 | 8/1995 | (JP) . |
| 9-059511 | 3/1997 | (JP) . |
| WO 00 24816 | 5/2000 | (WO) . |

* cited by examiner

Primary Examiner—David J. Buttner

(57) ABSTRACT

The invention relates to a method of making a conductive thermoplastic composition containing at least one dispersed phase polymer with a continuous phase polymer and at least one conductivity imparting agent wherein the bulk resistivity of the composition is at least partially determined by the particle size of the dispersed phase within the continuous phase. The thermoplastic composition preferably comprises a compatibilized blend of at least one polyphenylene ether resin, at least one polyamide resin, and at least one conductivity imparting agent, and optionally, one or more of impact modifiers, stabilizers, antioxidants, lubricants, and fillers.

18 Claims, No Drawings

CONDUCTIVE COMPOSITIONS WITH COMPOSITIONALLY CONTROLLED BULK RESISTIVITY

CROSS-REFERENCE TO RELATED APPLICATION

This application is a CIP of Ser. No. 09/307,194 filed May 7, 1999 now abandoned.

FEDERALLY SPONSORED RESEARCH

Not applicable.

BACKGROUND OF THE INVENTION

1. Field of the Invention

The invention relates to a method of making a conductive thermoplastic composition containing at least one dispersed phase polymer with a continuous phase polymer and at least one conductivity imparting agent wherein the bulk resistivity of the composition is at least partially determined by the particle size of the dispersed phase within the continuous phase. The thermoplastic composition preferably comprises a compatibilized blend of at least one polyphenylene ether resin, at least one polyamide resin, and at least one conductivity imparting agent, and optionally, one or more of impact modifiers, stabilizers, antioxidants, lubricants, and fillers. In one embodiment, this invention provides a method of controlling the bulk resistivity of a compatibilized blend of at least one polyphenylene ether resin and at least one polyamide resin, wherein the polyphenylene ether resin is a dispersed phase and wherein the method comprises varying the compatibilizing agent content and/or the level of level of copolymers between the polyphenylene ether resin and polyamide resin and/or the dispersed phase particle size.

The invention also relates to the conductive compositions of the method and articles made from the conductive compositions of the method.

2. Brief Description of the Related Art

Automobile manufacturers have for a number of years investigated the use of plastic body panels to replace stamped sheet metal panels. The motivation for the replacement has included weight reduction in addition to enhanced performance through elimination of dings and corrosion of the panels.

In the automotive assembly process, it is often desirable to assemble plastic panels and metal body panels onto the automotive frame in the same operation. An undercoating is subsequently applied through an electro-deposition process to afford corrosion resistance to the metal components. Subsequent to this process, paint is applied through an electrostatic process to insure a high transfer rate of the paint onto the panels. Each of these processes involves a baking step at elevated temperatures, often in excess of 180° C. and the high temperatures have been partly responsible for the limited success of plastics in these applications.

Plastic components are in general not sufficiently conductive for electrostatic paint processes. It is known in the art, however, that conductive additives can be formulated into the resin composition to increase the conductivity of the resin. These conductive additives are generally expensive, difficult to handle, and often adversely affect other critical properties such as ductility. Optimization of the quantity of conductive additive necessary for a particular application is desirable to avoid these and other adverse affects.

It is therefore apparent that a need continues to exist for methods of making conductive thermoplastic compositions.

SUMMARY OF THE INVENTION

The instant invention provides a method for making conductive thermoplastic compositions containing at least two polymers, a dispersed phase polymer and a continuous phase polymer, and at least one conductivity imparting agent wherein the bulk resistivity of the compositions is controlled at least in part, by varying the particle size of the dispersed phase polymer within the continuous phase polymer. The resin composition preferably comprises a compatibilized blend of at least one polyphenylene ether resin and at least one polyamide resin wherein the polyphenylene ether resin is a dispersed phase. The resin composition also comprises a conductivity impacting agent comprising either (a) a conductive carbon black powder present in an amount between about 0.5% by weight and about 3.0% by weight based on the entire weight of the resin composition, (b) a conductive carbon fibril present in an amount between about 0.2% by weight and about 3.0% by weight based on the entire weight of the resin composition, or (c) a combination of a conductive carbon black powder and a conductive carbon fibril present in a combined amount between about 0.2% by weight and about 3.0% by weight based on the entire weight of the resin composition wherein the conductivity impacting agent is present predominantly in the polyamide resin.

DETAILED DESCRIPTION OF THE INVENTION

The thermoplastic compositions of the present invention are made from resins able to withstand paint process oven temperatures. Useful resins include various polymer blends and alloys such as, for example, polycarbonate containing blends and alloys and polyphenylene ether containing blends and alloys. Examples of such polymer blends and alloys include polycarbonate/ABS, polyphenylene ether/polyester, polyphenylene ether/polyphenylene sulfide, and polyphenylene ether/polyamide. The resin composition is preferably a resin composition comprising a compatibilized blend of a polyphenylene ether resin and a polyamide resin.

Compatibilized blends of polyphenylene ether resin and polyamide resin are generally known in the art. These blends are typically made through reactive compounding techniques involving addition of a compatibilizing agent to compositions containing polyphenylene ether resin and polyamide resin. The compatibilizing agent is thought to result in reaction products between the polyphenylene ether resin and a polyamide resin and that these reaction products improve the compatibility between the polyphenylene ether resin and polyamide resin. The reaction products are believed to play a role in the reduction and stabilization of the dispersed phase particle size, key indices of compatibility. The improved compatibility results in enhanced physical properties such as, for example, increased ductility. Illustrative compatibilizing agents for blends of polyphenylene ether resin and polyamide resin include citric acid, maleic anhydride, fumaric acid, malic acid as well as various derivatives of the foregoing.

The polyphenylene ether resins (hereinafter referred to as "PPE") useful in the present invention include all known polyphenylene ether resins. Preferable resins include poly (2,6-dimethylphenylene ether) as well as the copolymer resins of 2,6-dimethylphenol and 2,3,6-trimethylphenol. In compositions wherein high heat resistance is desired to accommodate, for example, paint cure ovens, PPE having a glass transition temperature (i.e. Tg) higher than the oven temperature are desirable as is use of a polyamide resin having a melting point (i.e. Tm) greater than the oven temperature. The intrinsic viscosity is typically between about 0.20 and about 0.60 dl/g as measured in chloroform at 25° C. Other variations in the resins are also useful based upon similar principles.

The ratio of PPE to polyamide resin can vary widely but is preferably adjusted so that the polyamide resin remains the continuous phase. Preferably the polyamide is at least about 40% by weight of the total resin composition. Increasing the level of the polyamide results in enhanced ductility and flow and is often preferred. The resin compositions may contain more than one type of polyamide resin such as a blend of nylon 6 and nylon 6,6. When a mixture of nylon 6 and nylon 6,6 is used, it is often preferred to have a limited amount of nylon 6 in order to maximize the heat resistance of the compatibilized blend of PPE and polyamide resins. Minor amounts of nylon 6 are often useful at improving certain physical properties, for example, ductility. Moreover, the amine to acid endgroup ratio of the polyamide resin or mixture of polyamide resins may also be varied as well as the relative viscosity of the polyamide contained within the resin composition. Such variations are useful for fine-tuning certain physical properties desired in the final composition. These and other variations of the polyamide and the polyphenylene ether resins do not detract from the present invention.

The compositions of the invention may additionally contain various property modifiers such as elastomers for ductility enhancement. Useful elastomers for this purpose are known in the art and include, for example, styrenic block copolymers and various acid functionalized ethylene-propylene copolymers (e.g., EP-graft-maleic anhydride). Especially preferred are the so called elastomeric block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially or totally hydrogenated. Mixtures of these triblock copolymers and diblock copolymers are especially preferred in the present compositions.

Suitable A-B and A-B-A type block copolymers are disclosed in, for example, U.S. Pat. Nos. 3,078,254, 3,402,159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly($\alpha$-methylstyrene)-polybutadiene, polystyrene-polybutadiene-polystyrene (SBR), polystyrene-poly(ethylene-butylene)-polystyrene, polystyrene-polyisoprene-polystyrene and poly($\alpha$-methylstyrene)-polybutadiene-poly($\alpha$-methylstyrene), as well as the selectively hydrogenated versions thereof. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON.

Also useful elastomers include functionalized elastomeric polyolefins such as elastomeric polyolefins containing at least one moiety of the group consisting of anhydride, epoxy, oxazoline, and orthoester. The essential structural units of the elastomeric polyolefin are derived from ethylene and at least one $C_{3-8}$ 1-olefin, such as, propylene, 1-butene, 1-hexene, and 1-octene. The proportions of ethylene and at least one $C_{3-8}$ 1-olefin are not critical provided that they together constitute the major portion of the polymer.

In one embodiment, the functionalized elastomeric polyolefin is a functionalized ethylene-propylene rubber or a functionalized ethylene-propylene-diene elastomer. The diene portion is at least one non-conjugated diene, such as ethylidene norbornene, 1,4-hexadiene, or dicyclopentadiene. These elastomeric polyolefins are known in the art as EPR and EPDM elastomers.

A useful amount of the optional elastomeric block copolymers is between about 1% and about 15% by weight, preferably between about 1% and about 10% by weight, wherein the weight percentages are based on the entire weight of the composition. Various mixtures of the previous described impact modifiers are also useful. Other property modifiers include nucleating agents, flame retardants, stabilizers, pigments, dyes, and mineral fillers and reinforcing agents.

In order to render the composition sufficiently conductive to achieve the desired electrostatic paint capability, the resin composition contains at least one conductivity imparting agent, i.e. at least one conductive additive. The conductive additive is preferably selected from the group consisting of conductive carbon black, conductive carbon fibers including milled fibers, conductive carbon fibrils, and various mixtures thereof. The conductive additive can be added directly into the compatibilized blend during the melt processing step or preferably, the conductive additive can be pre-dispersed into one of the resins of the composition. It is preferable to pre-disperse the conductive additive into the polyamide phase so as to make a concentrate of the conductive additive in the resin that will ultimately become the continuous phase. In the practice of the invention it is preferred for the conductive material to reside primarily with the continuous, e.g., polyamide, phase as greater conductivity can be achieved with a smaller amount of the conductive additive. By reside primarily is meant that at least 50%, preferably at least 80% and most preferably essentially 100% of the conductive additive resides within the continuous phase. It is also possible to use more than one conductive additive concentrate in the preparation of the resin composition.

Useful conductive carbon blacks include Ketjenblack Black obtained from Akzo. Useful carbon fibrils include those obtained from Hyperion Catalyst International and having an average diameter of about 2 to about 200 microns with a length to diameter ratio of at least 100–1000 or greater. As previously discussed, the conductive material may be added directly into the resin composition or is preferably predispersed into a resin, preferably into a polyamide and used as a concentrate.

The amount of conductive material added is that amount that will result in a final resin composition having a specific volume resistivity below $1 \times 10^5$ Ohm-cm, preferably below $1 \times 10^4$ Ohm-cm, and having a surface resistance above $1 \times 10^5$ Ohm, preferably above $1 \times 10^6$ Ohm. More preferably, the resin composition has a specific volume resistively below $4 \times 10^4$ Ohm-cm and has a surface resistance above $3.5 \times 10^6$ Ohm. When the specific volume resistivity is below $10^4$ Ohm-cm, the resin composition is sufficiently conductive to allow for electrostatic painting. Conversely, when the surface resistance is above $10^5$ Ohm, the resin composition is not so conductive as to have electro-deposition of the corrosion inhibitor onto the plastic component, an undesirable affect. The range of conductive additive does vary depending on a number of factors such as, for example, the type of conductive additive and the ratio of polyphenylene ether resin to polyamide resin, as well as the molding conditions employed. One of skill in the art can readily determine an optimized set of molding conditions based upon, for example, the design of the molded article without undue experimentation. The range of conductive additive is generally between about 1.4% by weight and about 2.5% by weight, preferably between about 1.6% by weight and about 2.2% by weight based on the entire weight of the resin composition. Typically, when the resin composition comprises a conductive carbon black powder, it is present in an amount between about 1.5% by weight and about 2.3% by weight, preferably between about 1.6% by weight and about 2.0% by weight, all based on the entire weight of the resin composition. Also, when typically the resin composition comprises a conductive carbon fibril, it is present in an amount between about 0.3% by weight and about 3% by weight, preferably between about 1.6% by weight and about 2.0% by weight, all based on the entire weight of the resin composition.

In the practice of the invention, it was unexpectedly found that the PPE particle size plays an important role in the bulk resistivity of the composition for a given level of conductive additive and polymer ratio. As the PPE particle size decreases below a certain threshold value, the bulk resistivity of the composition unexpectedly increases. As previously discussed numerous factors are believed to play roles in determining the dispersed phase particle size. These factors include, for example, the weight ratio of the resins, the amine endgroup concentration of the polyamide, the level and type of compatibilizing agent, the molecular weights of the resins, and the mixing parameters used to prepare the resin composition. Accordingly, the present invention includes a method of making conductive thermoplastic composition containing at least dispersed phase polymer and a continuous phase polymer with at least one conductivity imparting agent wherein the bulk resistivity of the composition is controlled by varying the particle size of the dispersed phase polymer within the continuous phase polymer.

The method of the present invention is normally achieved by merely blending the ingredients under conditions for the formation of an intimate blend. Such conditions often include mixing in single or twin screw type extruders or similar mixing devices which can apply a shear to the components. All of the ingredients may be added initially to the processing system, or else certain additives may be precompounded with one or more of the primary components, preferably the PPE, the optional elastomers, and/or the polyamide. It appears that certain properties, such as impact strength and elongation, are sometimes enhanced by initially precompounding the PPE, elastomeric copolymers, optionally with any other ingredients, prior to compounding with the polyamide resin, however, these improvements are done at the expense of increasing the viscosity of the compatibilized composition. The conductive additive is preferably added in the form of a concentrate in polyamide resin with the other polyamide resin or alternatively, is added after some mixing of the polyamide and other components has been accomplished. While separate extruders may be used in the processing, these compositions are preferably prepared by using a single extruder having multiple feed ports along its length to accommodate the addition of the various components. It is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

Preferred components include PPE derived from at least 2,6-dimethyl phenol and having an intrinsic viscosity between about 0.35 and about 0.50 dl/g, at least one polyamide 6,6 having a relative viscosity between about 120 and about 135 when measured according to ISO 307 protocol and having an amine endgroup number between about 45 and about 55, polystyrene-poly(ethylene-propylene) and polystyrene-poly(ethylene-butylene)-polystyrene block copolymers, conductive carbon fibrils in the form of a concentrate of fibrils in polyamide resin, an amount of at least one compatibilizing agent to result in a PPE average particle size of between about 0.2 microns and about 3.0 microns.

Included in the present invention are articles made from the compositions of the method. Such articles include fenders, doors, quarter panels, rocker panels, trunk lids, hoods, mirror housings, bumpers, gas filler doors, and the like.

All patents cited herein are hereby incorporated by reference.

The following illustrative examples demonstrate various embodiments of the present invention. However, they are not intended to limit the invention in any manner.

EXAMPLES

A series of resin compositions based upon an impact modified compatibilized blend of a polyphenylene ether resin and a polyamide resin containing carbon fibrils and utilizing varying levels of a compatibilizing agent. By varying the level of compatibilizing agent while holding the remaining variables relatively constant, it was possible to determine the effect of particle size on bulk resistivity (a measure of conductivity). Bulk resistivity was determined on the narrow parallel portion of injection molded multi-purpose test specimen according ISO 3167. The test specimens were molded as described in ISO 2945 for dumb-bell bars with an injection molding machine. Both ends of the test specimen were broken off in a brittle fashion so as to obtain a portion with a uniform cross section of 10×4 mm and a length of about 70 mm with a fractured surface at both ends. The fracture surface at both ends was coated with a silver paint and the resistance was measured between the fractured surfaces with an electrical multimeter and corrected for dimensions to calculate the bulk resistivity. It is important that brittle fractured surfaces and not surface obtained by cutting with a knife or sawing and the like are used. When needed samples may be cooled to obtain brittle fracture surfaces.

The following materials were used in the formulations with all parts as parts by weight based on the entire weight of the composition:

PPE 0.46 IV poly(2,6-dimethylphenol) suppied by GE Plastics

G-1701 polystyrene-poly(ethylene-propylene) obtained from Shell Chemical Co.

G-1651 polystyrene-poly(ethylene-butylene)-polystyrene obtained from Shell Chemical Co.

I-1076 hindered phenol antioxidant obtained from Ciba-Geigy as Irganox 1076

PETS pentaerythritol tetrastearate obtained from Lonza Inc.

KI potassium iodide, obtained from Ajay Chemicals

CuI Copper(I) iodide, obtained from Ajay Chemicals nylon 6,6 grade Ultramid $10^5$ having an amine endgroup number of about 51 and a relative viscosity of about 126 carbon fibrils a 20 weight percent concentrate of carbon fibrils having an average diameter of about 10 to 15 microns in nylon 6,6 obtained from Hyperion Catalyst International maleic anhydride obtained from Amoco fumaric acid obtained from Aristech Chemicals.

The proportions used were PPE (38.6), G-1651 (6.9), G-1701 (3.3), I-1076 (0.3), PETS (0.3), KI (0.1), CuI (0.01), nylon 6,6 (32.4–33.2), conductive fibrils (6.5–8.5), maleic anhydride (0.3–0.7)

The data in Table 1 illustrates the change in bulk resistivity in KOhm-cm obtained by varying the maleic anhydride level in the compositions. The carbon fibril concentrate was used at a level of 8.5 weight percent based on the weight of the entire composition and corresponded to a level of fibrils of about 1.7 weight % based on the entire composition.

TABLE 1

| Sample | 1 | 2 |
|---|---|---|
| Maleic anhydride level | 0.3 | 0.7 |
| PPE particle size range (microns) | 0.4–1.9 | 0.3–1.1 |
| Bulk resistivity (Kohm-cm) | 19 ± 8 | 163 ± 39 |

As can be seen from the data in Table 1, as the level of compatibilizing agent increases the PPE particle size range decreases. Unexpectedly, the decrease in PPE particle size plays a role in the bulk resistivity of the composition wherein reducing the range of PPE particles sizes to a smaller average particle size increases the resistivity. Decreasing the particle size increases the need for a higher level of the conductive agent to achieve the same degree of conductivity.

The data in Table 2 using fumaric acid as the compatibilizer further illustrates the change in bulk resistivity in Kohm-cm as the PPE particle size changes. Two levels of carbon fibrils were utilized.

TABLE 2

| Sample | 3 | 4 | 5 | 6 | 7 | 8. |
|---|---|---|---|---|---|---|
| Fumaric acid | ,0.25 | 0.25 | 0.45 | 0.45 | 0.65 | 0.65 |
| Carbon fibril level | 1.0 | 1.4 | 1.0 | 1.4 | 1.0 | 1.4 |
| Bulk resistivity (Kohm-cm) | 25 ± 3 | 3 ± 0.5 | 1222 ± 465 | 9 ± 2 | Off scale | 109 ± 29 |

As seen by comparing sample 3 with sample 5 with sample 7, as the level of compatibilizing agent increased, the bulk resistivity also increased, due in large part to the reduction in PPE particle size from the increase in the level of compatibilizing agent. In order to obtain the same degree of conductivity, an increased loading the conductivity imparting agent was required.

It should be clear that the present invention includes a method of making a conductive composition having a bulk resistivity of less than 50 Kohm-cm, preferably less than about 20 Kohm-cm, most preferably less than about 10 Kohm-cm and using less than about 2.0 weight percent, preferably less than about 1.5 weight percent, of conductivity imparting agent based upon the total weight of the composition.

What is claimed is:

1. A thermoplastic composition, comprising:
   a dispersed phase comprising a polyphenylene ether;
   a continuous phase comprising a polyamide;
   0.25 weight percent to 0.45 weight percent of a compatibilizing agent; and
   about 0.2 weight percent to about 3.0 weight percent of a conductivity imparting agent selected from the group consisting of conductive carbon black, conductive carbon fibrils, and mixtures thereof,
   wherein the composition has a specific volume resistivity after molding of less than about 100 kOhm-cm.

2. The composition of claim 1, wherein the polyphenylene ether comprises at least one compound selected from the group consisting of poly(2,6-dimethylphenylene ether) and copolymers of 2,6-dimethylphenol and 2,3,6-trimethylphenol.

3. The composition of claim 1, wherein the polyamide comprises at least one compound selected from the group consisting of nylon 6 and nylon 6,6.

4. The composition of claim 1, comprising at least about 40 weight percent of the polyamide.

5. The composition of claim 1, further comprising one or more of impact modifiers, stabilizers, antioxidants, lubricants, and fillers.

6. The composition of claim 1, wherein the dispersed phase has an average particle size between about 0.2 microns and about 3 microns.

7. The composition of claim 1, wherein at least 50% of the conductivity imparting agent resides in the continuous phase.

8. The composition of claim 1, wherein at least 80% of the conductivity imparting agent resides in the continuous phase.

9. The composition of claim 1, wherein essentially all of the conductivity imparting agent resides in the continuous phase.

10. The composition of claim 1, comprising at least one conductivity imparting agent selected from the group consisting of conductive carbon black and conductive carbon fibrils.

11. The composition of claim 1, wherein the composition has a specific volume resistivity after molding of less than about 10 kOhm-cm.

12. The composition of claim 1, comprising at least one compatibilizing agent selected from the group consisting of citric acid, maleic anhydride, fumaric acid, malic acid, and derivatives of the foregoing compatibilizing agents.

13. The composition of claim 1, wherein the composition has a specific volume resistivity after molding of less than about 50 kOlm-cm.

14. The composition of claim 1, comprising less than about 1.5 weight percent of the conductivity imparting agent.

15. The composition of claim 1, wherein the conductivity imparting agent comprises carbon fibrils.

16. The composition of claim 1, wherein the composition has a specific volume resistivity after molding less than 20 kOhm-cm.

17. The composition of claim 1, further comprising about 1 weight percent to about 15 weight percent of an elastomeric block copolymer.

18. A method of preparing a conductive thermoplastic composition, comprising:
   blending to form an intimate blend
      a polyphenylene ether;
      a polyamide;
      about 0.2 weight percent to 0.45 weight percent of a compatibilizing agent; and
      about 0.2 weight percent to about 3.0 weight percent of a conductivity imparting agent selected from the group consisting of conductive carbon black, conductive carbon fibrils, and mixtures thereof;
   wherein the composition has a specific volume resistivity after molding of less than 100 kOhm-cm.

* * * * *